W. H. BONKEMEYER.
PLOW.
APPLICATION FILED APR. 14, 1916.
1,214,993.
Patented Feb. 6, 1917.
2 SHEETS—SHEET 2.
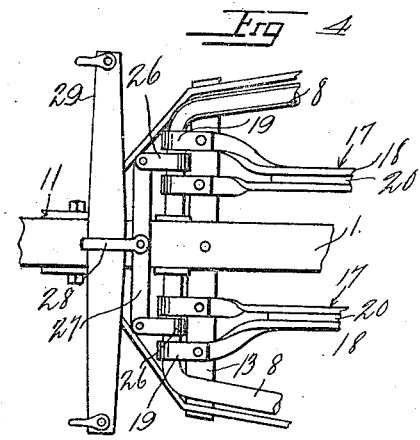
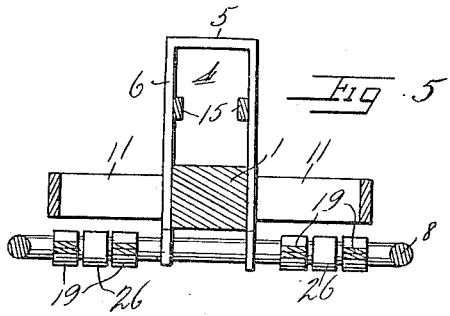
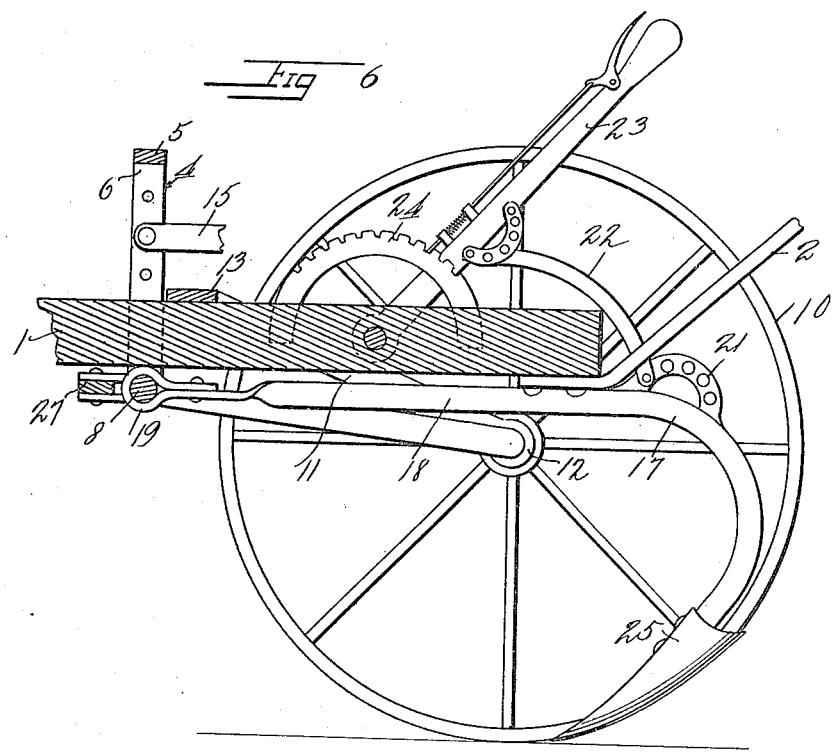
Witnesses
Inventor
W. H. Bonkemeyer
By
Attorney

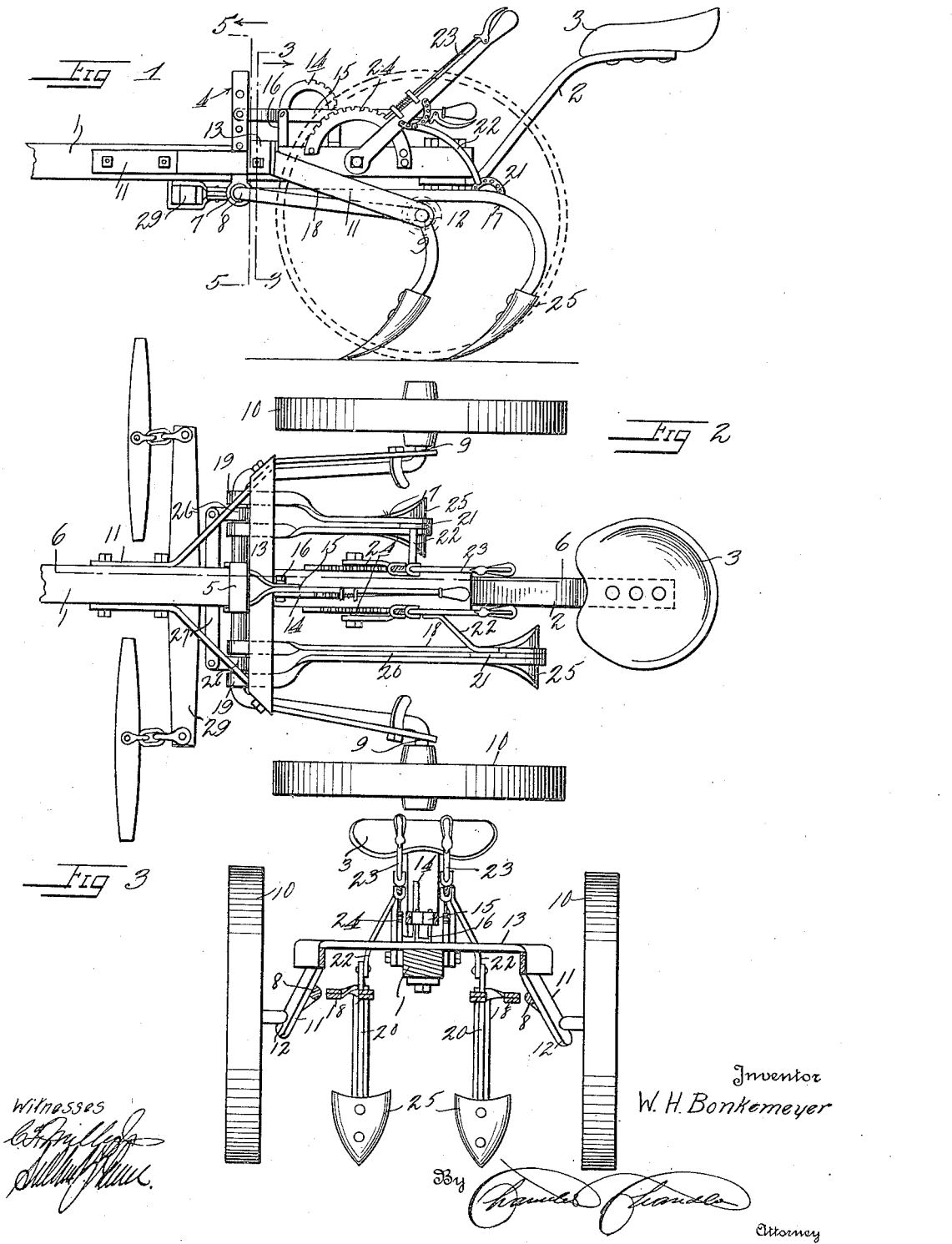

UNITED STATES PATENT OFFICE.

WILLIAM H. BONKEMEYER, OF RANDLEMAN, NORTH CAROLINA.

PLOW.

1,214,993.

Specification of Letters Patent.

Patented Feb. 6, 1917.

Application filed April 14, 1916. Serial No. 91,186.

*To all whom it may concern:*

Be it known that I, WILLIAM H. BONKEMEYER, a citizen of the United States, residing at Randleman, in the county of Randolph, State of North Carolina, have invented certain new and useful Improvements in Plows; and I do hereby declare the following to be a full, clear, and exact description of the invention, such as will enable others skilled in the art to which it appertains to make and use the same.

The present invention is directed to improvements in wheeled plows, and has for its object to provide a device of this character which is particularly adapted for use in plowing and breaking hard and dry soil.

A further object of the invention is to provide a plow of this character so constructed that the shovel beams thereof can be easily and quickly raised and lowered independently of each other.

A still further object of the invention is to provide a plow of this character so constructed that the driver can, from the seat, conveniently raise and lower the shovel beams.

With these and other objects in view, this invention resides in the novel features of construction, formation, combination and arrangement of parts to be hereinafter more fully described, claimed and illustrated in the accompanying drawing, in which:—

Figure 1 is a side elevation of the plow.

Fig. 2 is a top plan view thereof.

Fig. 3 is a sectional view on line 3—3 of Fig. 1.

Fig. 4 is a bottom plan view.

Fig. 5 is a sectional view on line 5—5 of Fig. 1.

Fig. 6 is a sectional view on line 6—6 of Fig. 2.

Referring to the drawing 1 indicates the tongue, the rear end of which has fixed thereto the bar 2 which supports the driver's seat 3, which may be of any conventional form.

A frame 4 is provided, and consists of a top bar 5 and side bars 6. The lower ends of the bars 6 are provided with bearings 7 which are engaged by the bight portion of the arched axle 8, said axle having its ends terminating in spindles 9 for rotatably engaging the ground wheels 10.

Bolted to the opposite sides of the tongue 1 are the forward ends of the bars 11, the rear end of said bars being provided with bearings 12 which engage the spindles 9 of the axle 8.

The bars 11 are bent outwardly and are held against spreading by the cross bar 13, which is bolted centrally to the tongue 1. Mounted centrally of the tongue 1 and rearwardly of the frame 4 is a rack segment 14 having associated therewith a hand lever 15, said lever being pivotally connected between the brackets 16 which are mounted on the tongue. Said lever having its forward end forked and pivotally connected to the side-bars 6 of the frame 4. Thus it will be seen that upon swinging the lever 15 downwardly that the frame 4 will be raised, thus swinging the bight portion of the axle 8 upwardly so as to regulate the distance of the tongue from the ground.

The plow beams 17 each consist of sections 18 which have their forward ends provided with eyes 19, said eyes being adapted to pivotally engage the bight of the axle 8. The sections 18 have engaged therebetween filling strips 20, the rear ends of which terminate in arched portions 21 which are pivotally connected to the lower ends of the links 22, said links having their upper ends pivotally associated with the hand levers 23, said levers being pivotally connected to the sides of the tongue 1 and are held in their adjusted positions by the rack segments 24.

The rear ends of the beams 17 have attached thereto in any well known manner the shovels 25.

Connected to the bight portion of the axle 8 are clips 26, said clips being connected to the bar 27. The bar 27 has connected thereto a clevis 28 which is, in turn, connected to the doubletree 29. Thus it will be seen that the draft animals pull directly upon the axle, and will not in any way interfere with the raising and lowering of the frame 4.

From the foregoing description it will be seen that upon actuation of the levers 23 that the beams 17 can be adjusted independently of each other, and that when it is desired to regulate the distance between the tongue 1 and the ground, it is only necessary to actuate the lever 15 whereupon the frame 4 may be raised or lowered, as desired.

It will be further noted that when the frame 4 is raised or lowered the pitch of the shovels 25 will be changed so that they may plow deep or shallow.

What is claimed is:—

A plow of the class described comprising a tongue, a vertical frame having its side bars slidably engaging the sides of the tongue, an arched axle having its bight portion pivotally connected to the frame, a hand adjusting lever pivotally supported by the tongue and pivotally connected to the frame, shovel supporting beams pivotally connected at their forward ends to the bight portion of the axle, means connected to the tongue for raising and lowering the beams, bars having their forward ends rigidly connected to the tongue, and having their rear ends pivotally connected to the axle, and draft means connected to the bight portion of the axle.

In testimony whereof, I affix my signature, in the presence of two witnesses.

WILLIAM H. BONKEMEYER.

Witnesses:
W. J. ARMFIELD, Jr.,
F. E. BYRD.

Copies of this patent may be obtained for five cents each, by addressing the "Commissioner of Patents, Washington, D. C."